United States Patent [19]

Fujimoto

[11] Patent Number: 5,143,205
[45] Date of Patent: Sep. 1, 1992

[54] FREE-FLOW CONVEYOR CHAIN

[75] Inventor: Kazutaka Fujimoto, Ishikawa, Japan

[73] Assignee: Enuma Chain Manufacturing Co., Ltd., Ishikawa, Japan

[21] Appl. No.: 708,832

[22] Filed: May 29, 1991

Related U.S. Application Data

[63] Continuation of Ser. No. 443,871, Nov. 30, 1989, abandoned, which is a continuation of Ser. No. 48,601, May 11, 1987, abandoned.

Foreign Application Priority Data

May 13, 1986 [JP] Japan .......................... 61-70736[U]

[51] Int. Cl.$^5$ .................................................. B65G 17/24
[52] U.S. Cl. .................................................... 198/779
[58] Field of Search ............. 198/779, 781; 193/35 A

[56] References Cited

U.S. PATENT DOCUMENTS

| | | | |
|---|---|---|---|
| 3,631,967 | 1/1972 | Converse et al. | 198/779 |
| 3,912,072 | 10/1975 | Kornylak | 198/779 |
| 4,103,769 | 8/1978 | Jorgensen | 198/781 |
| 4,339,030 | 7/1982 | Hirata | 198/779 |
| 4,361,225 | 11/1982 | Saur | 198/781 |
| 4,736,834 | 4/1988 | Kotegawa et al. | 198/779 |

Primary Examiner—Joseph E. Valenza
Attorney, Agent, or Firm—Bradford E. Kile; Ruffin B. Cordell

[57] ABSTRACT

A free-flow conveyor chain having a pin received by a chain element and a supporting roller for supporting an article being transmitted. The chain element is moved along a guide rail and an O-ring, excellent in resiliency, is interposed between the supporting roller and frictional element for preventing the supporting roller from dropping off the pin. The element is press-fitted to an end portion of the pin and engages an O-ring carried by the supporting roller. Thus, a frictional braking torque is applied to the supporting roller.

4 Claims, 2 Drawing Sheets

FREE-FLOW CONVEYOR CHAIN

This application is a continuation of application Ser. No. 443,871, filed Nov. 30, 1989 now abandoned which is a continuation of Ser. No. 048,601 filed May 11, 1987 now abandoned

BACKGROUND OF THE INVENTION

1. Field of the Invention

The present invention relates to a free-flow conveyer chain installed in an assembling line of a light-weight product such as an electronic component and the like.

2. Description of the Prior Art

In a conveyer installed in the assembling line of the light-weight product such as the electronic component and the like, it is often necessary to temporarily keep the product stationary in a certain step on the midway of the line. However, even when such necessity occurs in a certain step, products residing in other steps often must be moved in the same assembling line. Namely, it is necessary for the conveyer installed in the assembling line to permit some products to be free from the motion of the conveyer, while the conveyer permits the flow of the other products.

Consequently, for example, as shown in FIG. 5, in a conventional free-flow conveyer chain installed in the assembling line, a pin 1 is shaped into an elongated form larger in length than the width of a chain element 2 while inserted at its opposite ends into a pair of supporting rollers 4 for supporting an article 3 being transmitted, so that the pair of supporting rollers 4 are rotatably engaged with the pin 1. After being inserted into the supporting rollers 4, the pin 1 is press-fitted at its opposite ends to a pair of washers 5 each of which serves as a stopper means for preventing each of the supporting rollers 4 from dropping out of the pin 1, whereby the supporting rollers 4 are permitted to pass through a bottom surface 3a of the article 3 while rotatably driven. Incidentally, the reference numeral 6 denotes a guide rail for guiding the free-flow conveyer chain along the assembling line.

In such conventional free-flow conveyer chain, however, since the supporting rollers 4 are provided rotatably, it is impossible for such supporting rollers 4 to exert any traction on the article 3 being transmitted. As a result, at a time when the conveyer chain begins its operation or changes its operation speed, the article 3 to be transmitted by the conveyer chain begins moving under the influence of its inertia independently of the motion of the conveyer chain to cause a disturbance of article flow in which the articles 3 ar equally spaced from each other.

Further, in a conventional speed-amplifying free-flow conveyer chain, in order to make the transmitting speed of the article 3 larger than the traveling speed of the conveyer chain, the supporting roller 4 is rotatably driven by a small-diameter roller connected thereto, which small-diameter roller is smaller in diameter than the supporting roller 4 and supported by a guide rail 6 so as to be rotatably driven thereby when moved therealong. Namely, the supporting roller 4 is press-fitted to an extended boss of the small-diameter roller, so that the supporting roller 4 is rotatably driven with an unecessarily large and constant torque to cause a disturbance of the positioning of the article 3 and a collision of the articles 3 at a time when some article 3 is temporarily kept stationary in its transmitting operation, which causes a large energy loss.

In order to resolve the above problem, hitherto, as shown in FIG. 5, a spring 7 is interposed between one of the supporting rollers 4' and a washer 5 to produce a frictional force between the supporting roller 4' and an outer link plate 8 so as to impart a braking torque to the supporting roller 4'. A plurality of the thus constructed supporting rollers 4' are distributed to adequate positions over the conveyer chain so as to balance the inertia of the article 3 being transmitted, in order to accommodate the article 3 to the operation of the conveyer chain at a time when the conveyer chain begins to move or changes its operation speed.

Incidentally, although the thus constructed supporting rollers 4 for producing the braking torques are distributed to the adequate positions over the conveyer chain, they are adjusted in number and spacing so as to be accommodated to the actual assembling line through trial operations of the conveyer chain in site.

However, in the conventional conveyer chain employing the spring 7 as a means for imparting the braking force to the supporting roller 4', since the spring 7 requires its compression space, it is impossible for the supporting roller 4' engaged with the spring 7 to have a boss portion 4a at its outer side portion in contrast with a normal supporting roller 4 shown in a left-hand side of FIG. 5. Consequently, it is necessary for the conventional conveyer chain to provide both types of the supporting rollers 4 and 4', which increases the number of the parts of the conveyer chain to cause the part control and the assembling work of the parts to be troublesome, and also cause the adjusting work of the conveyer chain in site to be troublesome, so that much manual work is required to lead to a large labor and cost. In addition, since the spring 7 varies in quality according to variations of material, heating-treatment conditions, filament diameter, coil diameter and pitch, it is necessary to purchase at a time a large number of the springs 7 produced in the same lot, in order to accomplish the quality control of the springs 7. These are problems inherent in the conventional conveyer chain.

SUMMARY OF THE INVENTION

It is an object of the present invention to provide a free-flow conveyer chain for resolving the above problems, which conveyer chain employs one kind of supporting rollers and makes the adjusting work of such kind of supporting rollers in site quite easy.

According to one aspect of the present invention, there is provided: In a free-flow conveyer chain having a pin inserted into both of a chain element and a supporting roller for supporting an article being transmitted, said chain element being moved on a guide rail, the improvement wherein: an O-ring having a large resilient force is interposed between said supporting roller and a means for preventing said supporting roller from dropping out of said pin, said means being pressfitted to an end portion of said pin, so that said O-ring being urged to said supporting roller to impart a frictional braking torque to said supporting roller.

According to another aspect of the present invention, there is provided: In a free-flow conveyer chain having a pin inserted into both of a chain element and a supporting roller for supporting an article being transmitted, said chain element being moved on a guide rail, the improvement wherein: an O-ring having a large resilient force is interposed between said supporting roller and a roller of said chain element, so that said O-ring being urged to said supporting roller to impart a frictional braking torque to said supporting roller.

In order to mount said O-ring in a sure manner, it is preferable to provide a gap narrower than a filament-diameter of said O-ring in a position between said supporting roller and said means for preventing said supporting roller from dropping out of said pin or in a position between said supporting roller and said roller of said chain element, said O-ring being mounted in said gap.

It is possible to adequately establish a frictional engagement in a position between said O-ring and an outer end portion of a boss of said supporting roller on which said O-ring is mounted, or in a position between said O-ring and an outer end portion of said roller of said chain element, at least one of said outer end portions of said boss of said supporting roller and said roller of said chain element being notched to form a circular concave portion in corss section or being chamfered to form a concave portion at a corner thereof for receiving said O-ring therein in an easy and sure manner.

DESCRIPTION OF THE PREFERRED EMBODIMENTS

Hereinbelow will be described the present invention with reference to the drawings illustrating the embodiments of the present invention. It is clear that the present invention is not limited to these illustrated embodiments only.

Figure 1:
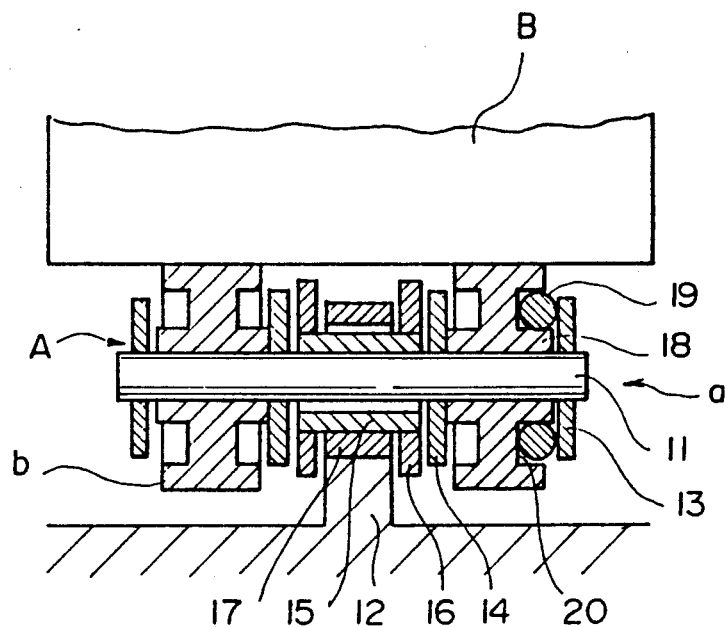
FIG. 1 is a cross sectional view of an embodiment of the free-flow conveyer chain of the present invention.

FIG. 1 shows a free-flow conveyer chain "A" of the present invention, in which conveyer chain "A" a pair of supporting rollers b are provided in a pin 11. The conveyer chain "A" travels on a guide rail 12.

A central portion of the pin 11 is inserted into a chain element "a" which travels on the guide rail 12 extending along the assembling line. In the opposite end portions of the pin 11 are rotatably mounted in an insertion manner a pair of supporting rollers b for supporting an article 3 being transmitted such as an electronic part and the like. In addition, at the opposite end portions of the pin 11 are press-fitted a pair of washers 13 serving as means for preventing the supporting rollers b from dropping out of the pin 11, such means may be also constructed of nuts threadably connected with the opposite end portions of the pin 11.

As is in a normal roller conveyer chain, the chain element "a" is constructed of: a pair of outer link plates 14 spaced apart from each other by a predetermined distance and mounted on the pin 11 in an insertion manner; a bushing 15 mounted between the outer link plate 14 and rotatably supported by the pin 11 inserted into the bushing 15; a pair of inner link plates 16 mounted on the opposite end portions of the bushing 15 in an insertion manner; and a roller 17 provided between the inner link plates 16 and mounted on the bushing 15 in an insertion manner, which roller 17 is positioned on an upper surface of the guide rail 12 to make it possible that the entire conveyer chain "A" is mounted on the guide rail 12 in a straddling manner to travel along the same 12.

Among the supporting rollers b, some supporting roller b adequately selected receives an O-ring 19 at an outer periphery of an outer boss portion 18 thereof, a filament-diameter of which O-ring 19 is larger in length than an axial length of the boss portion 18 of the supporting roller b. The O-ring 19 is urged to an outer side surface of the supporting roller b by means of the washer 13 so that a frictional braking torque is imparted to the supporting roller b.

In this embodiment of the present invention shown in FIG. 1, although the O-ring 19 having the filament-diameter larger in length than the axial length of the boss portion 18 of the supporting roller b is employed, it is also possible to impart the frictional braking torque to the supporting roller b by mounting an O-ring in an adequate gap formed between the supporting roller b and the means for preventing the supporting roller b from dropping out of the pin 11 by the provision of a notch formed in a corner of the boss portion 18 of the supporting roller b, an inner diameter of which O-ring is smaller than an outer diameter of the boss portion 18 of the supporting roller b.

It is also possible to mount a pair of O-rings in both of the supporting rollers b mounted on the pin 11, or also possible to mount the O-rings in the supporting rollers b adequately spaced apart from each other along the traveling path of the conveyer chain "A".

Preferably, the O-ring 19 is made of nitrile rubber excellent in resiliency.

In case that the O-ring 19 excellent in resiliency is employed according to the present invention, it is possible to obtain with the use of a less compression space the same frictional braking torque as that obtained in case that the conventional spring is employed.

Figure 2:
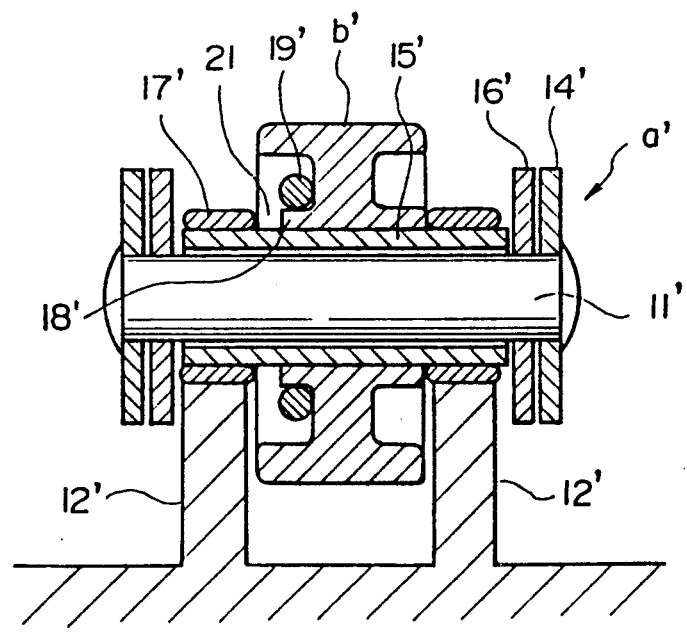
FIG. 2 is a cross sectional view of another embodiment of the present invention.

FIG. 2 shows a so-called speed-amplifying free-flow conveyer chain of the present invention. In this speed-amplifying free-flow conveyer chain, the supporting roller b' is mounted in a central position of the chain element a'. The roller of the chain element a' is divided into a pair of rollers 17', while a supporting roller b' is rotatably mounted on a central bushing 15' in an insertion manner. One of boss portions of the supporting roller b' is shortened to form a short boss portion 18' so that a gap 21 is formed between such short boss portion 18' and one of the rollers 17'.

An O-ring 19' larger in length than the width of the gap 21 is previously mounted on an outer periphery of the short boss portion 18' of the supporting roller b' in an insertion manner. The O-ring 19' is adequately selected in the site of the assembling line and mounted in the gap 21 in a dropping manner so that the O-ring 19' is compressed between the short boss portion 18' of the supporting roller b' and the roller 17' of the chain element a', whereby a frictional braking torque is imparted to the supporting roller b'.

Incidentally, both of the outer link plates 14' and the inner link plates 16' are rotatably mounted on the opposite ends of the pin 11' in an insertion manner, and then the opposite ends of the pin 11' are staked to complete the assembling of the chain element a'. The reference numeral 12' denotes the guide rail.

Figure 3:
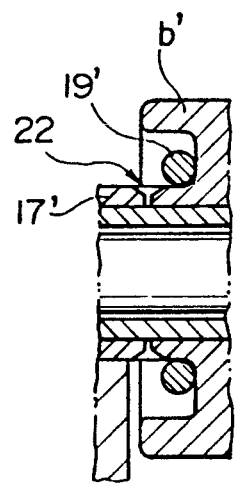
FIGS. 3 and 4 are partially enlarged cross sectional views of the free-flow conveyer chain of the present invention, illustrating the concave portion for receiving the O-ring, which concave portion is formed in a position between the boss portion of the supporting roller and the small-diameter roller.
Figure 4:
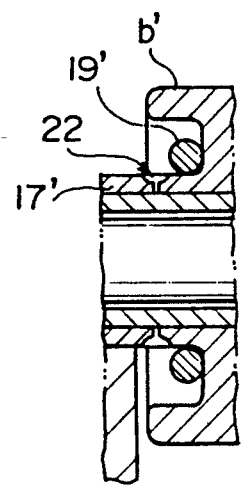
Figure 5:
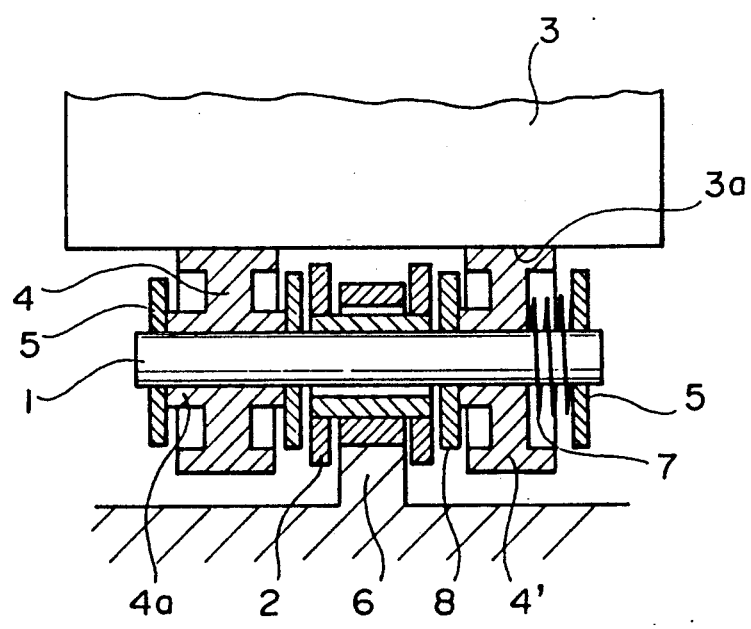
FIG. 5 is a cross sectional view of the conventional free-flow conveyer chain.

In this speed-amplifying free-flow conveyer chain of the present invention, although the front end of the boss portion 18' of the supporting roller a' is simply cut in a direction perpendicular to the axial direction of the pin 11' to form a short shape of the boss portion 18', it is also possible to form a concave portion 22 for receiving the O-ring 19' therein by notching at least one of the outer end portion of the boss portion of the supporting roller b' and the small-diameter roller 17' of the chain element a' so as to form a circular concave portion in cross section, or by simply chamfering a corner of at least one of the sames, as shown in FIGS. 3 and 4.

Also in the embodiment of the present invention shown in FIG. 2, although the O-ring 19' is mounted on only one side of the supporting roller b', it is naturally possible to mount the O-rings 19' on both side of the supporting roller b'. In addition, it is also possible to mount the O-rings 19' on the supporting rollers b selected over the traveling path of the speed-amplifying free-flow conveyer chain at adequate intervals.

According to the present invention described in the above, the O-ring excellent in resiliency is mounted in a position between the supporting roller and the means for preventing the supporting roller from dropping out of the pin, or in a position between the supporting roller and the roller of the chain element, to cause the O-ring to be urged to the supporting roller so that the frictional braking torque is imparted to the supporting roller. Consequently, such O-ring requires a less compression space in comparison with the conventional spring, while the supporting roller to which is imparted the frictional braking torque can be shaped into the same form as that of other supporting roller conducting a free rotation, to make it possible reduce the number of parts of the conveyer chain to lead to an easy part control and an easy assembling work, which enables the conveyer chain to be produced at a low cost.

In the free-flow conveyer chain of the present invention, since it is possible to easily impart an optimum or minimum driving force to the article being transmitted, it is possible to remarkably improve the positioning accuracy of the article being transmitted, which eliminates any problem occurring in the collision of the articles being transmitted and eliminates also a disturbance of the positioning accuracy of the articles. These are remarkable effects of the present invention.

In the conventional speed-amplifying free-flow conveyer chain, in case that the conveyer chain is put in a slight uphill condition in operation, the article being transmitted often slips down the conveyer chain. In contrast with such conventional conveyer chain, it is possible for the free-flow conveyer chain of the present invention to easily resolve the above-mentioned slipping problem inherent in the conventional conveyer chain by adjusting the number of the O-rings being mounted in the positions adjacent to the supporting rollers.

In the embodiment of the present invention shown in FIG. 1, the adjusting of the conveyer chain to be conducted in the site of the assembling line can be accomplished by simply passing the O-ring 19 over the means 13 so as to be mounted on the boss portion of the supporting roller. On the other hand, the O-ring 19 can be easily removed from the conveyer chain due to its resiliency when simply cut by a cutter.

In the embodiment of the present invention shown in FIG. 2, it is possible for the O-ring 19' to pass through the link plates 14' and 16' so as to be mounted in the gap 21 between the supporting roller b' and the roller 17' of the chain element a'. In case that the frictional braking torque is not required, the O-ring 19' is moved form the gap 21 to the boss portion 18' of the supporting roller b'. In case that the frictional braking torque is required, the O-ring 19' is again moved from the boss portion 18' to the gap 21 so as to be mounted therein.

In addition, in the embodiment of the present invention shown in FIG. 2, since the O-ring 19' is simply moved between the gap 21 and the boss portion 18' of the supporting roller b', it is possible to conduct the adjusting work of the the conveyer chain in a very swift manner, to make it possible to remarkably reduce the trial operation time of the conveyer chain for accomplish its adjusting work, whereby the cost is remarkably reduced.

Further, it is possible to easily obtain a necessary number of the O-rings which are free from problems inherent in the conventional spring, such as a fatigue, rust and the like occurring in use. In addition, since the O-ring 19' is provided with an adhesive properties, it is possible to impart a large amount of the frictional braking torque to the supporting roller b'.

What is claimed is:

1. A conveyor chain element for use in conjunction with a guide rail comprising:
    a guide roller in sliding engagement with said guide rail;
    a pin having an outer end and an intermediate portion received by said guide roller;
    at least one supporting roller;
    means for rotably mounting said supporting roller adjacent said outer end of said pin;
    a first side of said supporting roller having an annular groove of fixed axial dimension formed therein;
    a resilient O-ring partially disposed in said annular groove having cross sectional diameter in its relaxed state greater than the axial dimension of said annular groove;
    a washer fixedly secured to the end of said pin adjacent said annular groove and having a surface compressed against the surface of said O-ring which in turn is compressed against the surface of said annular groove to impart frictional resistance against the rotation of said supporting roller.

2. A conveyer chain element comprising:
    a pin;
    at least one supporting roller;
    means for rotatably mounting said supporting roller on said pin;
    at least one chain roller rotatably mounted on said pin adjacent said support roller;
    said supporting roller having a surface adjacent to said chain roller formed with a first notch adapted to receive a portion of a circular O-ring therein;
    said chain roller having a surface adjacent to said supporting roller formed with a second notch adjacent said first notch and adapted to receive a portion of a circular O-ring therein;
    a resilient circular O-ring disposed around said pin and disposed in said first and second notches, said resilient O-ring being of sufficiently small diameter to impart an inward compressive force to said supporting roller and said chain roller.

3. The conveyor chain element of claim 2 wherein said first and second notches are formed by chamfering the adjacent corners of at least one of said supporting roller and said chain roller.

4. The conveyor chain element of claim 2 wherein said first and second notches are formed by concave portions of the adjacent corners of said supporting roller and said chain roller.

* * * * *